United States Patent [19]
Dorsch

[11] 3,710,765
[45] Jan. 16, 1973

[54] CONTROL INSTALLATION FOR THE COOLING AIR FAN OF INTERNAL COMBUSTION ENGINES

[76] Inventor: Heinz Dorsch, Lenzhalde 3, Ditzingen, Germany

[22] Filed: Sept. 7, 1971

[21] Appl. No.: 177,968

[30] Foreign Application Priority Data

Sept. 8, 1970 Germany...................P 20 44 382.7

[52] U.S. Cl..............................123/41.12, 123/41.02
[51] Int. Cl................................................F01p 7/04
[58] Field of Search..123/41.12, 41.11, 41.02, 41.58, 123/41.08, 41.05, 41.15

[56] References Cited

UNITED STATES PATENTS 2,802,459  8/1957  Herbenar.........................123/41.12
3,483,852  12/1967  Newman et al....................123/41.12

FOREIGN PATENTS OR APPLICATIONS 1,048,089  12/1958  Germany..........................123/41.12
844,165  7/1939  France..............................123/41.12

*Primary Examiner*—Al Lawrence Smith
*Assistant Examiner*—Dennis D. Toth
*Attorney*—Craig, Antonelli & Hill

[57] ABSTRACT

A control installation for the cooling air fan of an internal combustion engine which is driven from the engine by way of a hydraulic coupling, in which the admission of the hydraulic medium to the hydraulic coupling is controlled by utilizing the expansion of the engine housing caused by the operating temperature of the internal combustion engine as the adjusting magnitude for the control device.

18 Claims, 4 Drawing Figures

PATENTED JAN 16 1973 3,710,765

Inventor:

HEINZ DORSCH

BY Craig, Antonelli & Hill
ATTORNEYS

CONTROL INSTALLATION FOR THE COOLING AIR FAN OF INTERNAL COMBUSTION ENGINES

The present invention relates to a control installation for the cooling air fan of internal combustion engines, which is driven by means of a hydraulic coupling whose admission of fluid to the blades is controlled by a control element.

The purpose of such types of control installations for cooling air fans is the matching of the cooling output to the thermal load of the internal combustion engine.

It is known to utilize as adjusting magnitudes for the controller both the throttle valve position as also the cooling air temperature (British Pat. No. 975,780). However, only two of a number of indirect influencing magnitudes which determine the operating temperature of the engine, are taken into consideration by the throttle valve position and by the cooling air temperature. These influencing magnitudes, which are not in direct connection with the engine temperature, entail the disadvantage that they are not effective at the same time as the engine temperature. In order to take into consideration this time displacement, damping members must be provided. Thus, for example, such a damping member must prevent that a brief, full opening of the throttle valve does not have as a consequence an immediate increase of the cooling air quantity and therewith a delayed decrease of the undesirable operating temperature of the engine. These requirements lead to an increased structural expenditure. Render the control installation more costly and render the same prone to failures and breakdowns.

The present invention is concerned with the task to provide a control installation which assures with a simple construction the maintenance of a desired operating temperature within narrow tolerances.

The underlying problems are solved according to the present invention in that the expansion of the engine housing produced by the operating temperature of the internal combustion engine serves as adjusting magnitude for the control element. Advantageously, an adjusting member transmits to the control member the linear expansion of a distance between two points of the engine housing. Preferably, an adjusting member of adjustable length is supported, on the one hand, in the camshaft housing and, on the other, within the area of the crankcase at a spring-loaded hollow piston and releases with increasing operating temperature of the internal combustion engine a larger flow cross section for the operating medium of the hydraulic coupling. It is particularly appropriate if the adjusting member is shielded against heat transmission stemming from the internal combustion engine. Preferably the adjusting member consists of a material whose coefficient of expansion is considerably lower, (for example, by 90 per cent) than the coefficient of thermal expansion of the material of the engine housing. According to a further feature of the present invention, the engine housing consists of a light-metal alloy (for example, GD Mg Al 8 Zn 1) and the adjusting member of a steel-nickel-alloy (for example, Invar steel). Preferably a rod of circular cross section is supported with a hemispherically shaped end in a socket mounted in the camshaft housing whereas it is screwed with its other end into a spherically shaped pin which is displaceably supported in a control cylinder secured at the crankcase and is supported in a socket of a control piston, by the end faces of which a central flow bore of a spring-loaded hollow piston supported in the crankcase is closed for such length of time until after reaching a predetermined temperature of the engine housing, the spring-loaded hollow piston comes into abutment at the screwed-on control cylinder and an increased flow cross section proportional to the temperature of the engine is then opened up by the oil pressure produced by a gear pump and acting on the control piston.

The advantages attained with the present invention consist especially in that a robust, sturdy control installation is produced which is influenced only by one adjusting magnitude, however, by means of which the desired operating temperature of the internal combustion engine is maintained within a narrow tolerance range at all output steps, rotational speed ranges, air temperatures, and other influencing magnitudes. The control mechanism according to the present invention assures a rapid warm-up of the internal combustion engine also at very low air temperatures. A complete combustion is reached rapidly so that the harmful exhaust gas components as well as the specific fuel consumption are kept slight.

These and other objects, features and advantages of the present invention will become more apparent from the following description when taken in connection with the accompanying drawings which shows, for purposes of illustration only, one embodiment in accordance with the present invention, and wherein.

Figure 1:
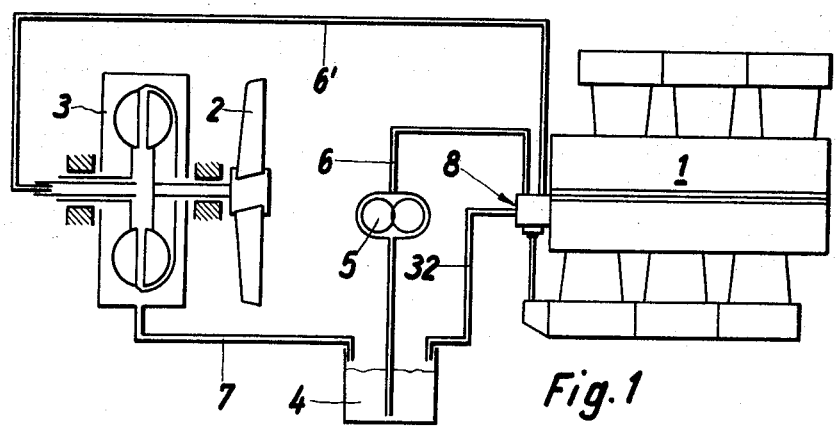
FIG. 1 is a schematic view of a cooling installation of an air-cooled six-cylinder internal combustion engine in accordance with the present invention.

Referring now to the drawing wherein like reference numerals are used throughout the various views to designate like parts, in the schematic view of FIG. 1, the air-cooled internal combustion engine 1 is supplied with cooling air by a fan 2. The fan 2 is conventionally driven from the internal combustion engine 1 by way of a hydraulic coupling 3. The oil required for operating the hydraulic coupling 3 is fed from a collecting tank 4 by means of a gear pump 5, which is also conventionally driven from the internal combustion engine 1, through a supply line 6, 6' to the hydraulic coupling 3. A return line 7 leads from the hydraulic coupling 3 back to the collecting tank 4. For the control of the flow cross section of the feed line 6, 6', a control mechanism generally designated by reference numeral 8 is arranged at the internal combustion engine 1.

Figure 2:
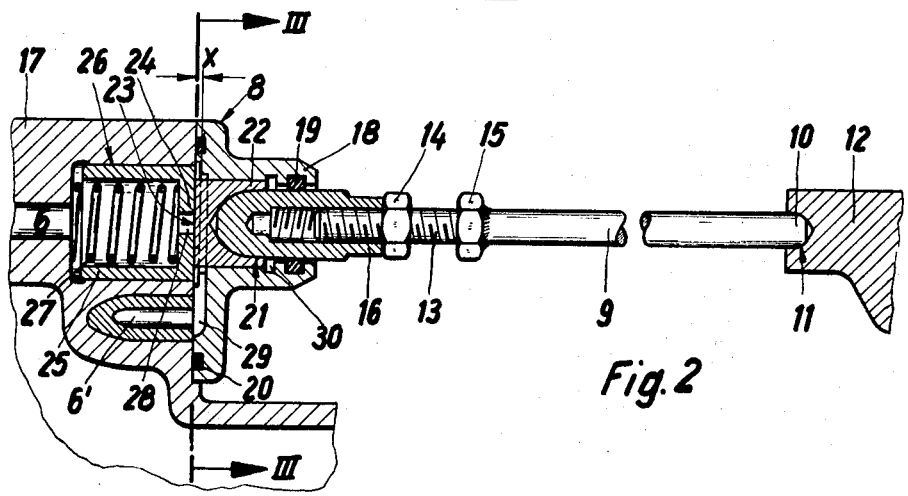
FIG. 2 is a partial cross-sectional view of the control mechanism of the cooling installation of the present invention, on an enlarged scale.
Figure 3:
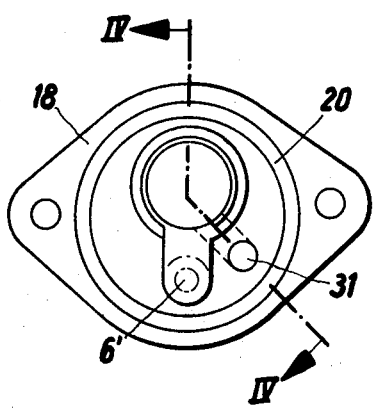
FIG. 3 is a cross-sectional view taken along line III—III of FIG. 2.
Figure 4:
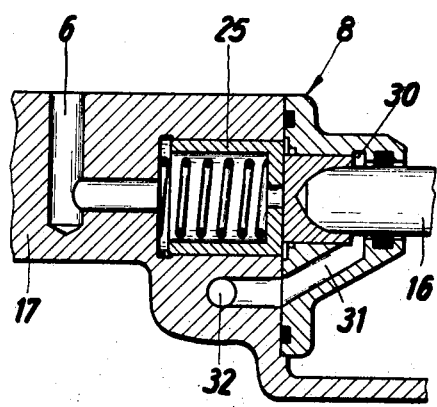
FIG. 4 is a cross-sectional view taken along line IV—IV of FIG. 3.

The control installation 8 is illustrated on an enlarged scale in FIGS. 2 to 4. The control installation 8 includes a round bar or rod 9 which is supported with a hemispherically shaped end area 10 thereof within a socket 11 in the camshaft housing 12. The other end area 13 of the round bar 9 is provided with an external thread, on which are screwed two nuts 14, 15 of which the inner nut 15 is welded to the round bar 9. The end area 13 is screwed into a ball pin 16 of at least part spherical configuration which is displaceably supported in a control cylinder 18 secured at the crankcase 17. The ball pin 16 is sealed with respect to the control cylinder 18 and the control cylinder is sealed with respect to the crankcase 17 by means of the sealing rings 19, 20. The round bar 9 and the ball pin 16 consist of a steel-nickel-alloy commercially sold under the tradename Invarsteel. The camshaft housing 12 and the crankcase housing 17 consist of an aluminum alloy which is known under the standard designation GD Mg Al 8 Zn 1. In the control cylinder 18 the ball pin 16 abuts in a socket 21 of a control piston 22. The control piston 22 is displaceably supported in the control cylinder 18 and abuts with its end surface 23 against the bottom 24 of a pot-shaped hollow piston 25. The hollow piston 25 is displaceably supported in a bore 26 of the crankcase 17 and is pressed by a coil spring 27 against the end face 23 of the control piston 22. The bottom 24 of the hollow piston 25 is provided with a central flow bore 28. The flow bore 28 is in communication with the feed line 6. A radial groove 29 leads from the inside of the control cylinder 18 to the feed line 6' supplying the hydraulic coupling 3. The control cylinder 18 is provided on the inside between the control piston 22 and the sealing ring 19 with an annularly shaped leakage oil groove 30, which is connected with the collecting tank 4 by way of a leakage oil bore 31 and a leakage oil line 32 (FIGS. 3 and 4).

In order to avoid a heat transmission from the engine housing 12, 17 to the adjusting member 9, 6, the control installation 8 is mounted in the cooling air stream. However, it is also possible to protect the rod 9 and the ball pin 16 by means of a sheet metal sleeve (not shown) against radiated heat.

The control of the cooling installation of the present invention takes place as follows:

Prior to the starting of the internal combustion engine 1, the length of the adjusting member consisting of the round bar 9 and of the ball pin 16 is so adjusted with the aid of the nuts 14 and 15 that the end face 23 of the control piston 22 comes into abutment against the bottom 24 of the hollow piston 25. As a result thereof, the coil spring 27 is prestressed and the amount of lead X indicated in dash line results therefrom. Thereupon, the length of the adjusting member, consisting of the round bar 9 and of the ball pin 16 has to be fixed by locking the nut 14 to the ball pin 16.

After the start of the internal combustion engine 1, at first no feed of oil to the hydraulic coupling 3 takes place. If the engine housing of the internal combustion engine 1 has expanded between the camshaft housing 12 and the crankcase 17 by the amount of lead X, then the bottom 24 of the hollow piston 25 abuts against the control cylinder 18 under the pressure of the prestressed coil spring 27 and under the pressure of the oil. During a further warming-up and ensuing expansion of the engine housing of the internal combustion engine 1, the fed oil pushes the control piston 22 away from the bottom 24 of the hollow piston 25. A gap results between the bottom 24 of the fixed hollow piston 25 and the control piston 22. This gap now connects the section 6 of the feed line with the section 6' thereof. The oil supplied by the gear pump 5 passes through the feed line 6 into the bore 26 of the crankcase 17, flows through the hollow piston 25, passes through the bore 28 in the bottom 24 and reaches through the resulting gap between the fixed hollow piston 25 and the control piston 22 which may be, for example, in the position indicated in dash and dot lines, into the groove 29. From the groove 29, the oil flows through the feed line 6' to the hydraulic coupling 3 which now drives the fan 2 which in turn begins to cool the internal combustion engine 1. With an increasing warm-up and expansion of the engine housing 12, 17, a larger gap will be opened up so that as a result of a greater admission of fluid to the hydraulic coupling 3, the rotational speed of the fan 2 increases.

With a temperature decrease and a shrinking of the engine housing 12, 17 as a result thereof, the gap is reduced by a displacement of the control piston 22 in the direction of the bore 28 and the cooling is reduced.

During the control operation, a small amount of leakage oil reaches the leakage oil groove 30, but flows back into the collecting tank 4 through the leakage oil bore 31 and the leakage oil line 32.

By an accurate matching between the diameter of the bore 28, the amount of lead X, the output of the gear pump 5 as well as the coefficients of expansion of the engine housing 12, 17 and of the round bar 9 and the ball pin 16 a constant desired operating temperature with only slight deviations is achieved.

The present invention is not limited to the illustrated embodiment. Thus, for example, also the lubricating oil of the internal combustion engine, which is already necessitated anyhow, can be used as operating oil for the hydraulic coupling so that the collecting tank 4 of the hydraulic coupling 3 and the oil pan of the internal combustion engine may form one and the same structural part.

Accordingly, I do not wish to be limited to the details shown and described herein, but intend to cover all such changes and modifications as are encompassed by the scope of the appended claims.

I claim:

1. A control installation for the cooling air fan of internal combustion engines with an engine casing, in which the cooling air fan is driven by means of a hydraulic coupling and in which the admission of fluid to the hydraulic coupling is controlled by a control means, characterized in that the expansion of the engine housing produced by the operating temperature of the internal combustion engine serves as adjusting magnitude for the control means.

2. A control installation according to claim 1, characterized by adjusting means operatively connected with said control means for adjusting said control means in dependence on the linear expansion of the engine housing.

3. A control installation according to claim 1, characterized in that an adjusting member transmits to the control means the linear expansion of a distance between two points of the engine housing.

4. A control installation according to claim 3, characterized in that the adjusting member is supported, on the one hand, in a camshaft housing and, on the other, within the area of a crankcase at a spring-loaded hollow piston, and in that the adjusting member with increasing operating temperature of the internal combustion engine opens up a larger flow cross section for the operating medium of the hydraulic coupling.

5. A control installation according to claim 4, characterized in that the adjusting member has an adjustable length.

6. A control installation according to claim 5, characterized in that the adjusting member is shielded against heat transmission on the part of the internal combustion engine.

7. A control installation according to claim 6, characterized in that the adjusting member consists of a material whose coefficient of thermal expansion is considerably lower than the coefficient of thermal expansion of the material of the engine housing.

8. A control installation according to claim 6, characterized in that the adjusting member consists of a material whose coefficient of thermal expansion is lower by about 90 percent than the coefficient of thermal expansion of the material of the engine housing.

9. A control installation according to claim 8, characterized in that the engine housing consists of a light metal alloy and the adjusting member of a steel-nickel alloy.

10. A control installation according to claim 9, characterized in that the light metal alloy is GD Mg Al 8 Zn 1 and the steel-nickel alloy is Invarsteel.

11. A control installation according to claim 7, characterized in that a rod of substantially circular cross section is supported with a hemispherically shaped end in a socket provided in the camshaft housing whereas with its other end it is threadably connected in an at least partly spherically shaped pin that is displaceably supported in a control cylinder means secured at the crankcase and is supported in a socket of a control piston means whose end face closes a central bore of the spring-loaded hollow piston supported in the crankcase for such length of time until after reaching a predetermined temperature of the engine housing, the spring-loaded hollow piston comes into an abutment at the threadably connected control cylinder means and then releases an increased flow cross section proportional to the temperature of the engine housing by the oil pressure produced by a gear pump and acting on the control piston.

12. A control installation according to claim 11, characterized in that the adjusting member consists of a material whose coefficient of thermal expansion is lower by about 90 percent than the coefficient of thermal expansion of the material of the engine housing.

13. A control installation according to claim 12, characterized in that the engine housing consists of a light metal alloy and the adjusting member of a steel-nickel alloy.

14. A control installation according to claim 4, characterized in that the adjusting member is shielded against heat transmission on the part of the internal combustion engine.

15. A control installation according to claim 4, characterized in that the adjusting member consists of a material whose coefficient of thermal expansion is considerably lower than the coefficient of thermal expansion of the material of the engine housing.

16. A control installation according to claim 15, characterized in that the engine housing consists of a light metal alloy and the adjusting member of a steel-nickel alloy.

17. A control installation according to claim 16, characterized in that the light metal alloy is GD Mg Al 8 Zn 1 and the steel-nickel alloy is Invarsteel.

18. A control installation according to claim 4, characterized in that a rod of substantially circular cross section is supported with a hemispherically shaped end in a socket provided in the camshaft housing whereas with its other end it is threadably connected in an at least partly spherically shaped pin that is displaceably supported in a control cylinder means secured at the crankcase and is supported in a socket of a control piston means whose end face closes a central bore of the spring-loaded hollow piston supported in the crankcase for such length of time until after reaching a predetermined temperature of the engine housing, the spring-loaded hollow piston comes into abutment at the threadably connected control cylinder means and then releases an increased flow cross section proportional to the temperature of the engine housing by the oil pressure produced by a gear pump and acting on the control piston.

* * * * *